United States Patent
Cheng et al.

(10) Patent No.: US 10,723,436 B2
(45) Date of Patent: Jul. 28, 2020

(54) METHODS AND APPARATUS TO INCREASE STRENGTH AND TOUGHNESS OF AIRCRAFT STRUCTURAL COMPONENTS

(71) Applicant: The Boeing Company, Chicago, IL (US)

(72) Inventors: Jiangtian Cheng, Mukilteo, WA (US); Forouzan Behzadpour, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 15/676,047

(22) Filed: Aug. 14, 2017

(65) Prior Publication Data

US 2019/0047677 A1    Feb. 14, 2019

(51) Int. Cl.
| | | |
|---|---|---|
| B64C 3/18 | (2006.01) |
| B64F 5/10 | (2017.01) |
| B29C 43/24 | (2006.01) |
| B29C 70/44 | (2006.01) |
| B29C 43/00 | (2006.01) |

(Continued)

(52) U.S. Cl.
CPC ............ *B64C 3/182* (2013.01); *B29C 43/003* (2013.01); *B29C 43/24* (2013.01); *B29C 48/022* (2019.02); *B29C 70/443* (2013.01); *B29D 99/0003* (2013.01); *B64F 5/10* (2017.01); *B29K 2105/12* (2013.01); *B29K 2501/12* (2013.01); *B29L 2031/3082* (2013.01); *B29L 2031/3085* (2013.01)

(58) Field of Classification Search
CPC .. B64C 1/061; B64C 1/064; B64C 2001/0072
See application file for complete search history.

(56) References Cited

U.S. PATENT DOCUMENTS

| | | | |
|---|---|---|---|
| 4,113,910 A | * | 9/1978 | Loyd ..................... B29C 66/112 428/162 |
| 5,248,711 A | * | 9/1993 | Buyny ....................... C08J 5/24 523/500 |

(Continued)

FOREIGN PATENT DOCUMENTS

| | | |
|---|---|---|
| EP | 2902179 | 8/2015 |
| EP | 2982500 | 2/2016 |

(Continued)

OTHER PUBLICATIONS

ROLLER Die + Forming, Roll Forming, 2015, Roller Die + Forming, pp. 2, 3, and 10 (Year: 2015).*

(Continued)

*Primary Examiner* — Nicholas McFall
*Assistant Examiner* — Terri L Filosi
(74) *Attorney, Agent, or Firm* — Hanley, Flight & Zimmerman, LLC (57) ABSTRACT

Methods and apparatus to increase strength and toughness of aircraft structural components are disclosed. An example apparatus includes a composite structure of an aircraft, a stringer coupled to the composite structure of the aircraft, where the stringer and the composite structure form a stringer radius gap. A gap filler is disposed in the stringer radius gap, which includes chopped fibers randomly distributed throughout an entire volume of the gap filler.

20 Claims, 6 Drawing Sheets

(51) Int. Cl.
*B29C 48/00* (2019.01)
*B29D 99/00* (2010.01)
B29K 105/12 (2006.01)
B29K 501/12 (2006.01)
B29L 31/30 (2006.01)

(56) References Cited

U.S. PATENT DOCUMENTS

| | | | |
|---|---|---|---|
| 9,463,880 B2 | 10/2016 | Vetter et al. | |
| 2010/0178495 A1* | 7/2010 | Taketa | B29C 70/14 428/339 |
| 2011/0318518 A1* | 12/2011 | Altonen | A45D 40/262 428/36.9 |
| 2014/0238579 A1* | 8/2014 | Dan-Jumbo | B29C 73/10 156/94 |
| 2014/0374013 A1* | 12/2014 | Hansen | B29C 33/307 156/243 |
| 2015/0125655 A1* | 5/2015 | Kajita | B64C 1/064 428/136 |
| 2015/0217850 A1 | 8/2015 | Tien et al. | |
| 2016/0176500 A1 | 6/2016 | Ross et al. | |

FOREIGN PATENT DOCUMENTS

| | | |
|---|---|---|
| EP | 3009468 | 4/2016 |
| EP | 2764987 B1 | 9/2016 |
| JP | H04299110 | 10/1992 |
| KR | 20170014205 | 2/2017 |
| WO | 2015020675 | 2/2015 |

OTHER PUBLICATIONS

European Patent Office, "Extended European Search Report," issued in connection with European Patent Application No. 18186499.2, dated Jan. 29, 2019, 8 pages.

United States Patent and Trademark Office, "Non-Final Office Action," issued in connection with U.S. Appl. No. 15/913,488, dated Jan. 10, 2020, 15 pages.

European Patent Office, "Extended European Search Report," issued in connection with European Patent Application No. 19160519.5, dated Jul. 15, 2019, 10 pages.

Mukherjee et al., "Design guidelines for ply drop-off in laminated composite structures," dated Jan. 1, 2001, Composites:Part B, vol. 32, No. 2, 12 pages.

* cited by examiner

METHODS AND APPARATUS TO INCREASE STRENGTH AND TOUGHNESS OF AIRCRAFT STRUCTURAL COMPONENTS

FIELD OF THE DISCLOSURE

This disclosure relates generally to structural components of aircraft and, more particularly, to methods and apparatus to increase strength and toughness of aircraft structural components.

BACKGROUND

Fuselages and wings of aircraft may include support structures, such as stringers, to help the fuselage and wings maintain their shape under various stress and strain conditions. In some examples, each stringer may include a gap adjacent a skin of the fuselage or the wings. The gaps may be filled to provide strength and/or rigidity to the stringer assembly.

SUMMARY

An example apparatus includes a composite structure of an aircraft, a stringer coupled to the composite structure of the aircraft, where the stringer and the composite structure form a stringer radius gap. A gap filler is disposed in the stringer radius gap, which includes chopped fibers randomly distributed throughout an entire volume of the gap filler.

An example method includes generating chopped fiber flakes, forming chopped fiber flakes into a gap filler, and curing the gap filler formed by the chopped fiber flakes.

Another example method includes inserting a cured gap filler into a gap of a stringer, covering the gap filler with a skin to form a stringer assembly, and curing the stringer assembly.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Fuselages and/or wings of aircraft may include support structures, such as stringers, to help the fuselage and/or wings maintain a shape under various stress and strain conditions and/or increase a strength of the fuselage and/or wings. In some examples, the stringers are shaped such that a gap is formed adjacent a skin of the fuselage or wings. The gaps may be filled using laminate structures or uni-noodles. However, laminate gap fillers can crack due to different thermal and mechanical properties of the laminate gap filler and the stringer and/or the skin. For example, a stringer may have a different rate of thermal expansion than the laminate gap filler, and the gap filler may crack due to the stress and/or strain placed on the gap filler due to the different rates of thermal expansion. Cracking in a laminate gap filler or a uni-noodle can weaken a stringer interface and reduce the stiffener pull off load carrying capability, which requires additional reinforcement and stringer plies.

In the illustrated examples described herein, the stringers include gaps filled by a chopped carbon fiber filler that is multi-directional. More specifically, the gap filler has carbon fibers oriented in multiple directions in any given plane of the gap filler. Orienting carbon fibers in multiple directions relieves thermal stress placed on the gap filler due to different rates of thermal expansion of the gap filler, the stringer, and/or the skin. The example gap fillers described herein relieve thermal stress, particularly in the out-of-plane direction (e.g., a direction perpendicular to a plane of the skin).

In the illustrated examples described herein, a composite structure (e.g., a fuselage of an aircraft) is coupled to one or more stringers for support. The example stringers may also be made of a composite material, or may be made of, in some examples, aluminum. The example stringers may have edge chamfers of approximately 15 degrees, which may reduce a load and improve a peel-off moment of the bonded parts (e.g., the stringer and gap filler after being cured). When the stringer is coupled to the composite structure, the stringer and the composite structure form a stringer radius gap. A gap filler is disposed in the stringer radius gap to provide additional structural reinforcement. The example gap fillers described herein include chopped fibers oriented in multiple directions. In some examples, the gap filler also includes a thermoset resin in which the chopped fibers are disposed and distributed.

The fibers are randomly dispersed throughout an entire or substantially an entire volume of the gap filler such that the fibers are oriented in multiple directions in any given plane of the gap filler (e.g., an x-y plane, an x-z plane, a y-z plane, or any skewed plane). For example, on any given plane of the gap filler, longitudinal axes of the fibers may be oriented in multiple directions and/or may travel across and/or through the plane. As used herein, the phrase "substantially the entire volume" means more than 75% of the volume of the gap filler includes at least a portion of at least one fiber. Additionally, the fibers may be evenly dispersed or distributed such that the density of the fibers is substantially the same (e.g., between 0.04 and 0.06 lbs/cube inch) throughout the gap filler. The density of the fibers throughout the gap filler may be substantially the same as the density as the fibers throughout the stringer, which reduces the likelihood that a crack will form between the gap filler and the stringer. In some examples, the fibers can also be positioned within the gap filler such that individual fibers may be curved and/or bent in multiple directions. The multi-directional (e.g., substantially omnidirectional) fibers may, in some examples, be substantially perpendicular to a plane parallel to the skin of the aircraft, or may be oriented in any other direction (e.g., parallel, not parallel) relative to the plane parallel to the skin.

A method of manufacturing the gap filler includes generating chopped fiber flakes, forming the chopped fiber flakes into a gap filler, and curing the gap filler formed by the chopped fiber flakes. The example method can further include mixing the chopped fiber flakes with a resin. In some examples, forming the chopped fiber flakes into a gap filler includes extruding the chopped fiber flakes through a die cut to match a cross-sectional profile of a gap in which the gap filler is to be disposed. Alternatively, forming the chopped fiber flakes into a gap filler includes using a multiple variable diameter roller die forming process. In other examples, forming the chopped fiber flakes into a gap filler includes applying heat and pressure to the gap filler, where the gap filler is disposed in a mold. In some examples, generating chopped fiber flakes includes cutting a fiber sheet into strips and/or squares. In some examples, the fiber flakes are 1 inch squares. Alternatively, the flakes can be any other suitable size.

A method of using the gap filler with the stringer gap includes inserting a cured gap filler into a gap of a stringer, covering the gap filler with a skin to form a stringer assembly, and curing the stringer assembly. In some examples, curing the stringer assembly includes applying pressure and heat to the stringer assembly. The example method further includes placing the stringer assembly within a vacuum bag. For example, the vacuum bag can be used to apply pressure to the stringer assembly, and a heat source (e.g., an autoclave) can provide heat. The method can further include installing the cured stringer assembly in an aircraft.

Figure 1:
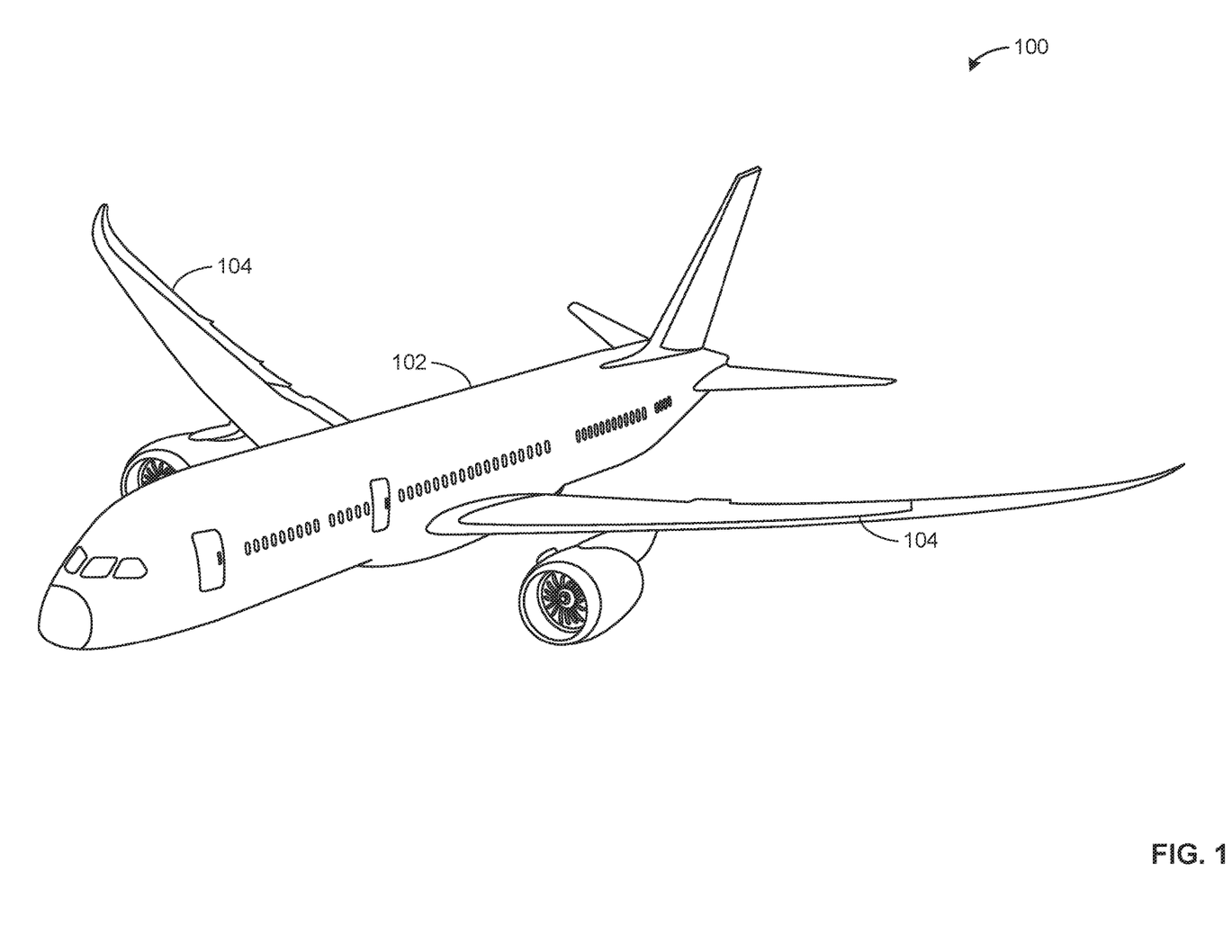
FIG. 1 illustrates an aircraft including a fuselage with which example composite structures described herein may be implemented.

FIG. 1 illustrates an example aircraft 100 with which the example apparatus and methods described herein may be implemented. The example aircraft 100 includes a fuselage 102, which may enclose a passenger cabin and/or a cargo area. The example fuselage 102 may include a skin and stringers. The stringers provide structural support to the skin of the fuselage. In some examples, the fuselage 102 may be a multi-ply composite fuselage 102 such as a carbon fiber reinforced plastic fuselage. Alternatively, the fuselage 102 can be made of a different type of composite material. The example aircraft 100 includes wings 104 (e.g., a right wing and a left wing) extending laterally outward from the fuselage 102. The example wings 104 also include stringers to provide structural support to a skin of the wings 104. The example wings 104 can be made of substantially the same composite material as the composite fuselage 102. Alternatively, the wings 104 can be made of a different composite material.

Figure 2:
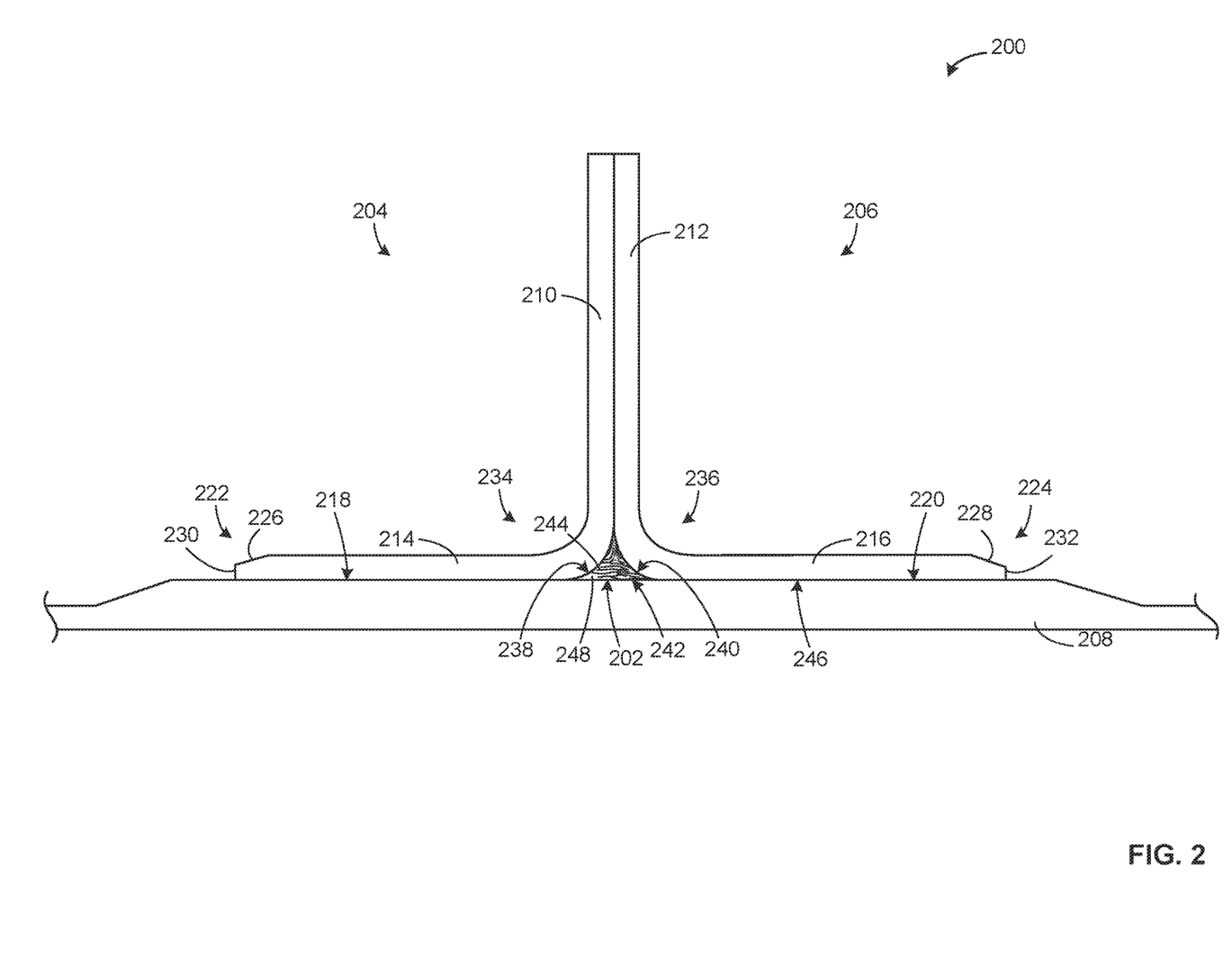
FIG. 2 depicts an example stringer including an example gap filler as described herein.

FIG. 2 depicts an example stringer assembly 200 including a gap filler 202 made using chopped fiber, as described herein. The example stringer 200 includes two stiffener segments 204, 206 coupled to a skin 208 (e.g., a skin of the aircraft 100) to provide support to the structure (e.g., the fuselage 102, the wings 104). In some examples, the stringers 200 may be implemented on the aircraft 100 to provide support for the fuselage 102 or the wings 104. In such examples, the example wings 104 and/or the fuselage 102 of the aircraft 100 can include multiple stringers 200 along the length of the wings 104 and/or the fuselage 102. Alternatively, the stringers can be used to provide support to another structure, such as another type of aircraft, a watercraft, a land vehicle, etc. The example stringers 200 described herein can be made of a composite material. Alternatively, the stringers 200 can be any other suitable material.

The example stringer 200 is formed by coupling the two stiffener segments 204, 206 so that respective first portions 210, 212 of the stiffener segments 204, 206 extend perpendicularly from the skin 208 to which the stringer 200 is coupled. Where the stringer 200 is coupled to the fuselage 102, the example first portion 210 of the stringer 200 is substantially perpendicular from the skin 208 at any given cross-section of the stringer 200 along the length of the fuselage 102. Each stiffener segment 204, 206 includes a respective second portion 214, 216 having a mating surface 218, 220. Each of the second portions 214, 216 of the stiffener segments 204, 206 is coupled to the skin 208. The second portions 214, 216 of the stiffener segment 204, 206 are substantially perpendicular to the first portions 210, 212. The second portions 214, 216 of the respective stiffener segments 204, 206 extend from the stringer 200 in opposite directions. That is, the first portions 210, 212 are coupled together and disposed between the respective second portions 214, 216 of the stringer 200.

Each of the example second portions 214, 216 includes respective ends 222, 224 having a chamfer 226, 228 that improves a pull-off load of the stringer 200 by reducing a peel-off moment capability of the stringer 200, thus reducing a skin peel-off stress. The chamfer 226, 228 in the example stringer 200 illustrated in FIG. 2 is a 15-degree chamfer ±2 degrees (e.g., the chamfer angle has a range between 13 degrees and 17 degrees). The chamfer angle of approximately 15 degrees was selected to provide the greatest force required to pull-off the stringer. The reduction of the chamfer angle to 15 degrees provides a significant increase in the required pull-off strength compared to 90 degrees, 45 degrees, and 30 degrees. The chamfer angle of 15 degrees also improves a stringer to skin transverse tensile strength compared to that of a 45 degree chamfer.

The chamfer 226, 228 does not taper to a point, but instead tapers to an edge 230, 232 that is 0.1±0.02 inches thick to reduce peel-off moment capability of the stringer 200 without causing premature failure. The example gap filler 202 described herein enables a smaller stringer flange chamfer angle (e.g., 15 degrees) to be used to reduce the peel-off moment of the bonded composite part (e.g., the gap filler 202, the stringer 200). The example chamfer angle of 15 degrees balances a bonding strength and a peel-off moment of the stringer 200.

In the illustrated example, the first and second portions 210, 212, 214, 216 of each stiffener segment 204, 206 are joined by a respective fillet 234, 236. The fillets 234, 236 can be operative to increase a strength of the example stringer 200 and/or may reduce the possibility of cracking of the example stringer 200 at the intersection of the two portions 210, 210, 214, 216 of the stiffener segments 204, 206. Opposite the fillets 234, 236, corners (e.g., rounds) 238, 240 of the example stiffener segments 204, 206 are also rounded or radiused at the intersection where the first and second portions 210, 212, 214, 216 of the respective stiffener segments 204, 206 meet. That is, the example stiffener segments 204, 206 are substantially the same width through both the first and second portions 210, 212, 214, 216, and the edge at which the first and second portions 210, 212, 214, 216 meet. The example rounds 238, 240 of the respective stiffener segments 204, 206 form a gap 242 (e.g., a stringer radius gap) where the two stiffener segments 204, 206 of the stringer 200 meet, adjacent to the rounds 238, 240 and the skin 208. The gap 242 of the illustrated example is filled with the gap filler 202 (e.g., a noodle, a radius filler, a carbon fiber gap filler, a composite gap filler, a chopped fiber gap filler, or combinations thereof).

The example gap filler 202 is made of a chopped carbon fiber material 244. The chopped carbon fiber material 244 helps relieve thermal stress of the stringer 200 because the gap filler 202 expands and contracts at a rate similar to the expansion and contraction rates of the other components of the stringer 200 (e.g., the stiffener segments 204, 206) and the skin 208. Because the expansion rates of the gap filler 202, the stiffener segments 204, 206, and the skin 208 are similar, the gap filler 202 and/or the stiffener segments 204, 206 are significantly stronger and more resistant to cracking. The example gap filler 202 described herein also prevents separation at a bondline 246 (e.g., a plane between the stiffener segments 204, 206 and the skin 208) because of the similar expansion and contraction rates of the gap filler 202 and the stiffener segments 204, 206. In some examples, the chopped carbon fibers 244 are mixed with a resin 248. The materials (e.g., carbon fiber sheets) used for the gap filler 202 may be similar to the materials used for the stiffener segments 204, 206 of the stringer 200 and for the skin 208. That is, the skin 208 and the stiffener segments 204, 206 may be made using carbon fiber sheets, which may also be used to make the fiber flakes of the gap filler 202.

The gap filler 202 can include chopped fiber reinforced thermoset resin composites or chopped fiber reinforced thermoplastic resin composites. In some examples, carbon fiber reinforced epoxy resin thermoset sheet material, such as supplied by Toray or Zoltek, can be used to make gap filler 202. A continuous prepreg sheet can be cut into 1 inch wide strips, then cut into 1 inch squares (e.g., flakes) to have relatively random and even fiber distribution throughout an entire volume of the gap filler 202. Alternatively, the flakes can be any suitable size (e.g., each edge of a flake may be between 0.005 inches and 3 inches, with a preferred range of 0.125 inches to 1 inch). The fibers of the fiber flakes may be oriented such that the fibers are multi-directional within the gap filler 202 (i.e., fibers may be oriented in multiple directions at any given plane of the gap filler 202).

Additional flakes of particles, such as nanoparticles can optionally be added to toughen the resin. Thus, the example gap filler 202 can be formed by incorporating chopped fiber or microfiber with micron or nanoparticle sized flakes of carbon fiber and a thermoset or thermoplastic resin or foam composite material having a minimized coefficient of thermal expansion, a reasonable fracture toughness (e.g., at least 2 in-lb/square inch), and a similar or softer modulus of elasticity (e.g., between 0.5 msi and 8 msi. compared to the stiffener segment material.

In some examples, the gap filler 202 can include nanoparticles to increase a toughness of the gap filler 202. The chopped fibers 244 of the gap filler 202 include carbon fibers (e.g., fibers that can withstand up to 350 degrees Fahrenheit), fiberglass, aramid, KEVLAR®, or nylon. The gap filler 202 has a fracture toughness of at least 2 in-lb/square inch and a minimum tensile strength of 15 ksi. The gap filler 202 has an elastic modulus between 0.5 msi and 8 msi. The fiber volume fraction of gap filler 202 is between 45% and 65%, with a preferred fraction of 50%. An example chopped fiber length is between 0.005 inch and 3 inches, with a preferred range of 0.125 inch to 1 inch. High molecular weight resin, such as epoxy or PEEK resin, is used to provide a final cure temperature (Tg) of 250 degrees Fahrenheit or higher. The density of gap filler 202 is between 0.04 and 0.06 lbs/cube inch. The shrinkage of the gap filler 202 due to temperature change is between 0.001 and 0.008 inches. The coefficients of linear thermal expansion are between $0.1 \times 10^{-6}$ and $10.0 \times 10^{-6}$ inch/inch degrees Fahrenheit in all directions.

The example gap filler 202 and stringer 200 fabrication methods described herein have a number of advantages. The multi-directional fiber orientation and substantially uniform fiber distribution maintains radius interface geometry (i.e., maintaining a shape of the gap filler 202). The carbon fiber material for the gap filler 202 has properties compatible with the stringer 200 and the skin 208 to minimize thermal stress to minimize the possibility of crack initiation, minimize stringer thermal distortion during curing, and reduce creep relaxation or creep strain in the gap filler 202 when in service. The example gap filler 202 can be formed using a molding or extrusion process for high rate of production. The small taper angle of the chamfer 226, 228 reduces the peel-off moment/load of the stringer assembly 200.

Additionally, the example gap filler 202 has smaller coefficients (i.e., compared to a laminate gap filler) of thermal expansion in all directions, including the thickness direction, to reduce thermal strain generated due to temperature change during processing and service. The example gap filler 202 also has reduced filler compression and/or expansion in cooling-down and/or heating up during processing and service, which prevents crack initiation. The example gap filler 202 has a moderate coefficient of thermal expansion to reduce the thermal stress that drives cracking within the gap filler 202 and at the interface between the gap filler 202 and the stiffener segments 204, 206 and/or skin 208 to improve the interface static and fatigue performance. A microstructure of 3D fiber distribution inside the example gap filler 202 allows for stress relaxation to prevent crack development. The example gap filler 202 also prevents ply wrinkling in the fillet (e.g., a stiffener radius) 234, 236 or the skin 208 underneath by providing support for radius dimension control at those filled gap locations during curing and service for part quality. The example gap filler 202 minimizes the stress concentrations at the gap 242 to improve a strength of a stiffener interface during use. The example gap filler 202 also improves pull-off load, which increases structural reliability, and makes stiffened composite panels suitable for a wing, an empennage, a fuselage, and/or floor beam structures.

Figure 3:
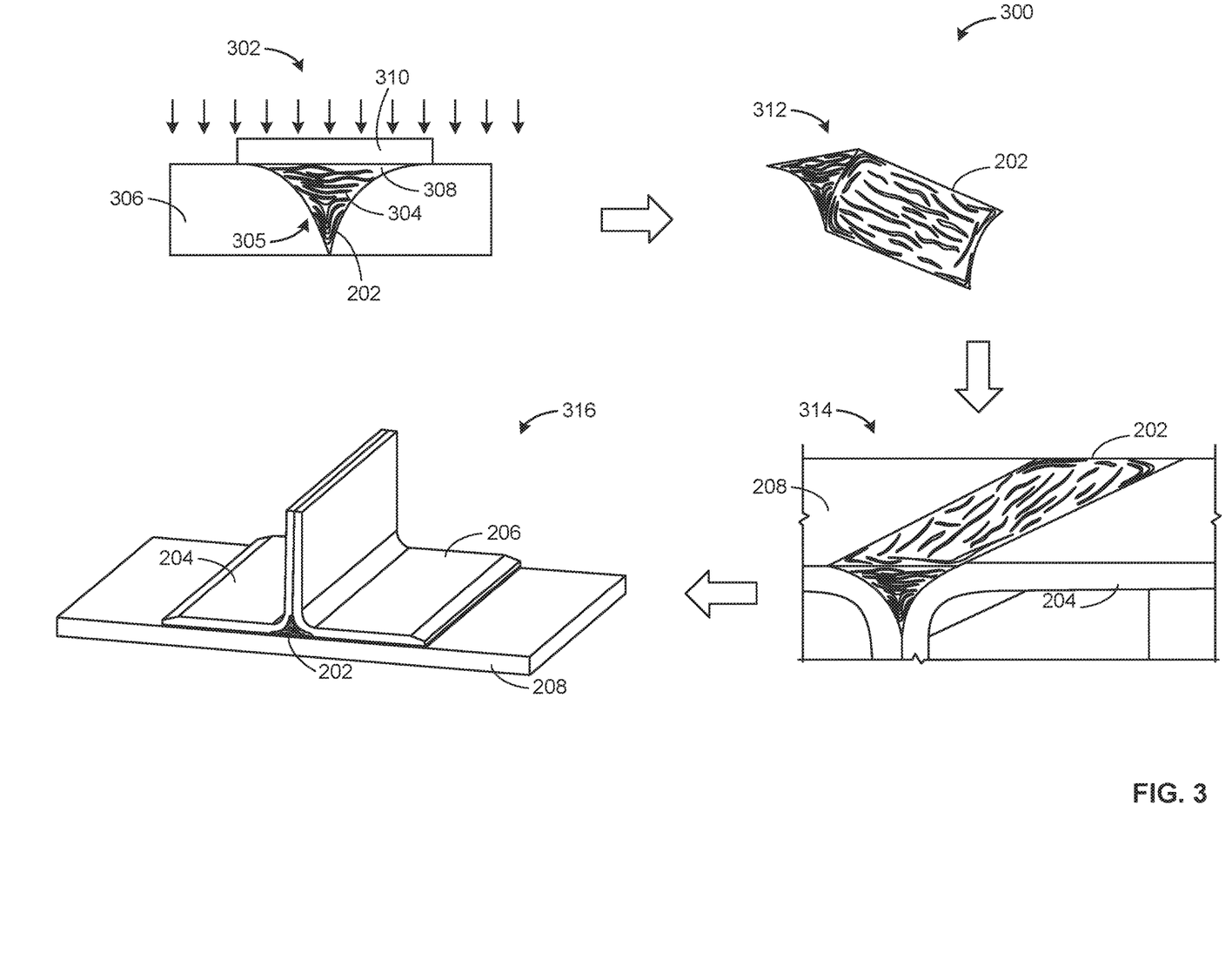
FIGS. 3-5 depict an example manufacturing process of the example gap filler described herein.

FIG. 3 depicts an example manufacturing process 300 of the gap filler 202 described herein. The example manufacturing process 300 of FIG. 3 uses a molding process to form the example gap filler 202. During a first stage 302, chopped fiber flakes 304 are inserted into a cavity 305 of a mold 306 so that the fiber flakes 304 are distributed throughout the volume of the cavity 305 (e.g., randomly, evenly distributed such that the fiber flakes 304 and, thus, the individual fibers making up the fiber flakes 304 are oriented in multiple directions). The fiber flakes 304 may be mixed with resin 308 prior to being disposed in the cavity 305 and/or the resin 308 can be poured into the mold 306 after the fiber flakes 304 are inserted in the cavity 305 of the mold 306. The chopped fiber mix (e.g., the mixture of the fiber flakes 304 and the resin 308) can be inserted into the mold 306 with some overfill (e.g., 15% or less overfill). The example gap filler 202 can be formed in the mold 306 using a first stage curing process. The first stage curing process can include applying heat and pressure to the chopped fiber mix using a plate 310 and a heat source. In some examples, the heat source may be integrated with the plate 310. The heat and pressure can be applied for a period of time sufficient for the chopped fiber mix to cure and form the example gap filler 202. The example gap filler 202 can be cooled in the mold 306.

In some examples, during the first stage 302, a vacuum bag is applied for about 5-10 minutes to compact the gap filler 202 and extract air voids inside the gap filler 202. After compacting, the gap filler 202 and mold 306 are placed in an oven, which is heated to 250 degrees for approximately 10-15 minutes to complete a first stage cure. This example first stage cure can cure up to about 85% cross-link to form the initial shape for final fit into the gap 242 of the stringer 200. After the first stage of the cure, the oven cools down to room temperature.

During a second stage 312, the example gap filler 202 may then be removed from the mold 306 after the gap filler 202 is formed and cured. The example gap filler 202 has a substantially even distribution of fibers (e.g., the distribution of fiber flakes is such that the distribution of the fibers is substantially even and the directions in which the individual fibers are oriented are random) throughout the volume of the gap filler 202. The gap filler 202 can then inserted into the gap 242 of the stringer 200 in a third stage 314.

After the gap filler 202 is inserted in the gap of the stringer 200, the stiffener segments 204, 206 are coupled to the skin 208 during a final stage 316 (e.g., a fourth stage) to form the stringer assembly 200. In some examples, the stringer assembly 200 is cured using a final cure process. The final cure process may include applying pressure and/or heat to the example stringer assembly 200. In some examples, a vacuum bag is placed around the example stringer assembly 200 during the final curing process. In some examples, the final co-cure with the stringer 200 and skin 208 is performed in an autoclave at a high pressure and a temperature up to 350 degrees Fahrenheit. After the final cure process, the stringer assembly 200 can be installed, for example, on the example aircraft 100.

Figure 4:
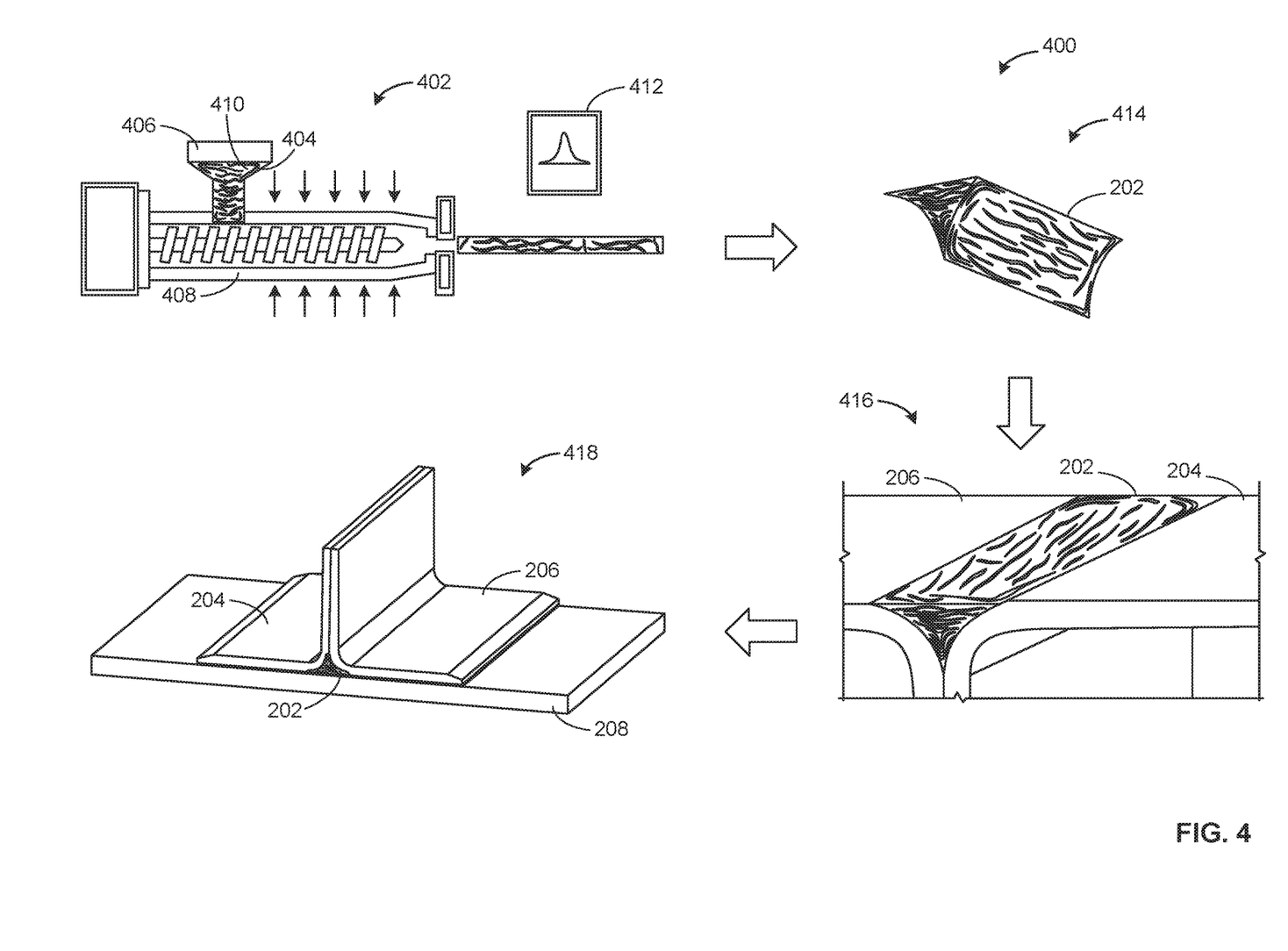

FIG. 4 depicts another example manufacturing process 400 of the gap filler 202 described herein. The example manufacturing process 400 of FIG. 4 uses an extrusion process to form the example gap filler 202. During a first stage 402, example chopped fiber flakes 404 are inserted into a hopper 406 of an extruder 408. The example chopped fiber flakes 404 and resin 410 are extruded through a die 412 that has been cut to form the gap filler 202 that fits within the gap 242 of the stringer 200. During the extrusion process, heat may be applied to the extruder 408 and the resin 410 and chopped fiber 404 mix being extruded. After the mixture is extruded through the die 412 to form the gap filler 202, the gap filler 202 can be cooled during a second stage 414. The gap filler 202 can then inserted into the gap 242 of the stringer 200 in a third stage 416.

After the gap filler 202 is inserted in the gap 242 of the stringer 200, the stiffener segments 204, 206 are coupled to the skin 208 during a final stage 418 (e.g., a fourth stage) to form the stringer assembly 200. In some examples, the stringer assembly 200 is cured using a final cure process. The final cure process may include applying pressure and/or heat to the example stringer assembly 200. In some examples, a vacuum bag is placed around the example stringer assembly 200 during the final curing process. In some examples, the final co-cure with the stringer 200 and skin 208 is performed in an autoclave at a high pressure and a temperature up to 350 degrees Fahrenheit. After the final cure process, the stringer assembly 200 may be installed, for example, on the example aircraft 100.

Figure 5:
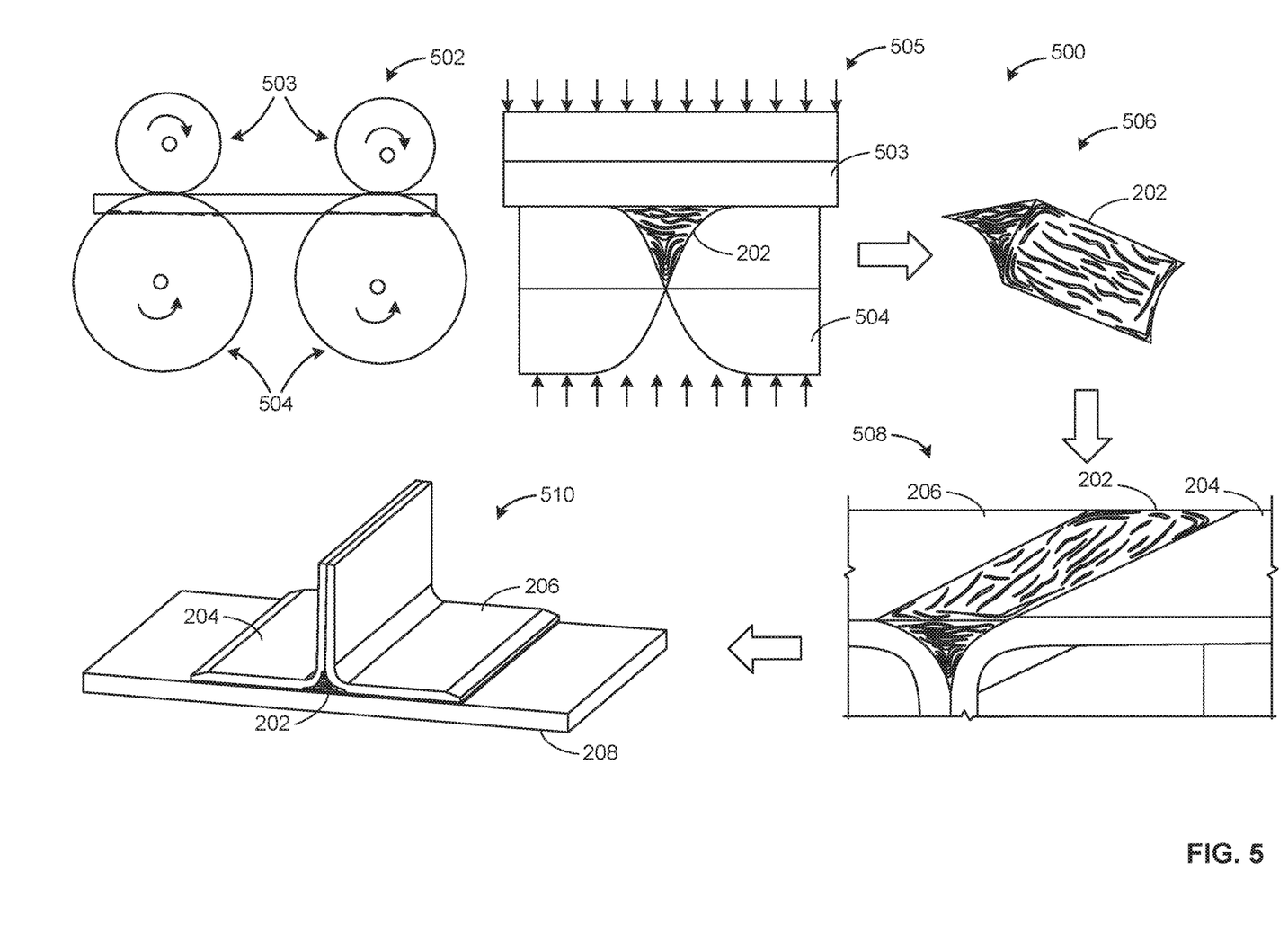

FIG. 5 depicts another example manufacturing process 500 of the gap filler 202 described herein. The example manufacturing process 500 of FIG. 5 is an automated roller die process. In a first stage 502, the example process 500 uses a series of rollers 503, 504 to from the gap filler 202 in the desired shape. Heat may also be applied as the rollers 503, 504 form the gap filler 202. In the illustrated example, dashed lines in the first stage 502 represent an opposite side of the gap filler 202 as the gap filler 202 is formed by the rollers. A cross-sectional view 505 of the rollers 503, 504 depicts the cross-sectional shape of the gap filler 202, which corresponds to the shape of the gap 242 in the stringer 200. In the illustrated example, in order to form the gap filler 202 in the shape that corresponds to the gap 242, one upper roller 503 and two lower rollers 504 may be used in each set of rollers. After the gap filler 202 is formed, the gap filler 202 can be cooled during a second stage 506. The gap filler 202 can then inserted into the gap 242 of the stringer 200 in a third stage 508.

After the gap filler 202 is inserted in the gap 242 of the stringer 200, the stiffener segments 204, 206 are coupled to the skin 208 during a final stage 510 (e.g., a fourth stage) to form the stringer assembly 200. In some examples, the stringer assembly 200 is cured using a final cure process. The final cure process can include applying pressure and/or heat to the example stringer assembly 200. In some examples, a vacuum bag is placed around the example stringer assembly 200 during the final curing process. In some examples, the final co-cure with the stringer 200 and skin 208 is performed in an autoclave at a high pressure and a temperature up to 350 degrees Fahrenheit. After the final cure process, the stringer assembly 200 can be installed, for example, on the example aircraft 100.

Figure 6:
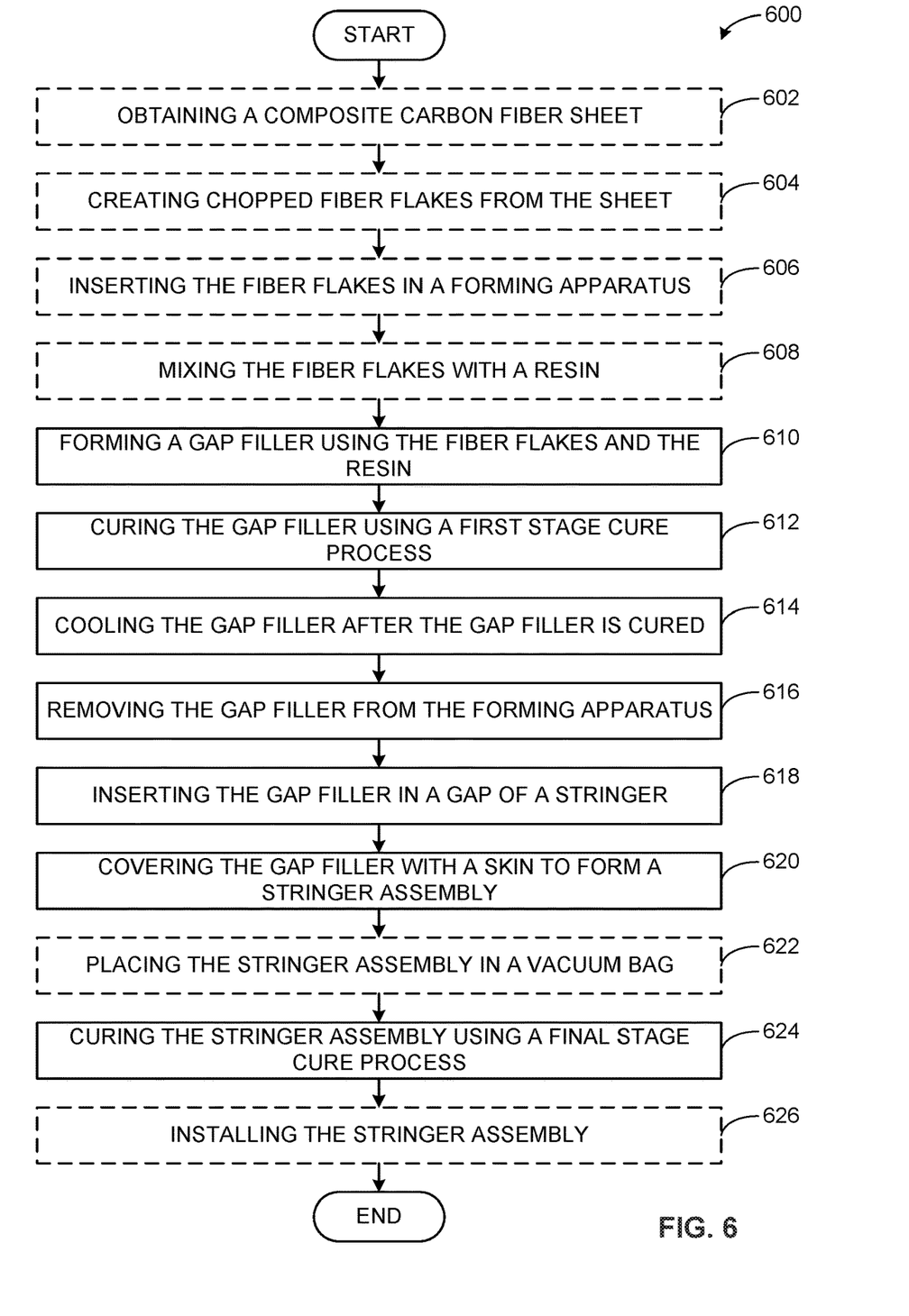
FIG. 6 depicts an example flowchart representative of an example method of manufacturing the example gap filler of FIGS. 1-5.

FIG. 6 depicts an example flowchart representative of an example method 600 of manufacturing the example gap filler 202 of FIGS. 1-4. In some examples, the blocks can be re-arranged or removed, or additional blocks may be added. The example method 600 can begin by obtaining a carbon fiber sheet (e.g., a prepreg sheet) (block 602). Chopped fiber flakes 304 can be created from the carbon fiber sheet by cutting the sheet into strips and/or squares (block 604). In some examples, the strips are 1 inch wide, and the squares are 1 inch squares. The example strips or squares can be then inserted in a forming apparatus (e.g., the mold 306, the hopper 406 of the extruder 408, or the rollers 504, etc.) (block 606). In examples in which the flakes 304 can be inserted into the mold 306, the flakes 304 can be arranged to create a random distribution of fiber flakes 304 throughout the volume of the gap filler 202. The fiber flakes 304 can be mixed with a resin 308 (e.g., an epoxy) (block 608). In some examples, the fiber flakes 304 are mixed with the resin 308 prior to being inserted in the forming apparatus (e.g., block 608 occurs before block 606). In the illustrated example method 600, the order of execution of the blocks may be changed, and/or some of the blocks described may be changed, eliminated, or combined, particularly blocks 602-608.

After the fiber flakes 304 and the resin 308 are inserted into the forming apparatus, the forming apparatus uses a combination of heat and pressure to form the example flake and resin mixture into the gap filler 202 (block 610). The example gap filler 202 can then be cured using a first stage cure process (e.g., using a combination of heat and pressure) (block 612). After the gap filler 202 is cured, it is cooled (block 614). In some examples, the gap filler 202 can remain in the forming apparatus during cooling. In such examples, the gap filler 202 is then removed from the forming apparatus after cooling (block 616). If the gap filler 202 does not remain in the forming apparatus during cooling at block 614, the gap filler 202 may be removed prior to cooling.

After the gap filler 202 is cured and cooled, the example gap filler 202 is inserted into the gap 242 of the stringer 200 (block 618). The gap filler 202 and stringer 200 are covered by a skin 208 (e.g., a skin of a fuselage, a skin of a wing), and a stringer assembly 200 is formed (block 620). The example skin 208 may be a carbon fiber composite skin, including similar materials as the example gap filler 202. The example stringer assembly 200 can be placed in a vacuum bag and/or an autoclave (block 622) and can be cured using a final stage process including heat and pressure (block 624). Block 622 can be eliminated from the example method 600. The example stringer assembly 200 can then be installed in the aircraft 100 (block 626). Alternatively, the example method 600 ends at block 624.

The example gap fillers 202 described herein can be produced using quick molding or extrusion processes, which can shorten build time and pre-form the gap filler 202 into the appropriate shapes for easy assembly with the stringer 200. Thus, the co-cure of the stiffener segments 204, 206 with the gap filler 202 and the skin 208 is more efficient. The example gap filler and processes for manufacturing the example gap filler can reduce a cycle time (compared to a typical co-bon curing cycle time) because only one final cure is needed and the example gap fillers have a greater thermal tolerance. Additionally, the example gap fillers improve an interface quality between the stiffener segments and the skin 208, which reduces additional treatment and installation costs. The interface quality can be improved because the material of the gap filler is similar to the material of the stiffener segments and, thus, the gap filler and the stiffener segments react similarly to heating and cooling. In-factory repair associated down time for maintenance related to composite stringers is reduce due to the robust thermal tolerance, quality, and reliability of the stringer.

The example gap filler 202 is created using chopped or micro fiber with micron or nano particles or flakes. The fibers reinforce a thermoset resin, a thermoplastic resin, or a foam composite material having a minimized coefficient of thermal expansion, a reasonable toughness, and a similar or softer modulus of elasticity (compared to the stiffener segments 204, 206). The gap filler 202 is used to fill in the gaps between stiffener segments 204, 206 and skin 208 at the radius or curvature change intersections.

The example gap filler 202 described herein reduces tooling and processing development costs because the gap filler can be formed using automated processes to quickly pre-from the gap filler 202 into a designated shape for quick assembly. The final cure uses an existing autoclave process to cure the assembly, which eliminates additional and/or expensive tooling and complex process development. Additionally, the improved thermal tolerance due to engineered thermo-mechanical properties of the gap filler can minimize thermal strain and/or stress caused by interface failure and reduce extensive engineering costs related to development for various laminated- or uni-noodles that are vulnerable to thermal cracking and are in need of larger arrestment fasteners. The gap filler 202 described herein for composite stiffener segments and skins improves interface integrity and requires less integration support from interface structures. The example gap filler also enables the development of efficient interface structures, such as shear ties, for weight saving and fuel performance improvement.

The example gap filler also provides for reduced manufacturing and labor time due to the automated processes that may be used to form the gap filler. Parts having a higher thermal tolerance may be used to reduce fabrication time for the gap fillers. Surface treatment can also be reduced because of the improved thermal tolerance and interface quality of the gap filler. There is no longer a need for laminate gap filler trimming, softening, or additional damage arrest fasteners and radius reinforcement, which further reduces manufacturing time and costs.

From the foregoing, it will be appreciated that example methods, apparatus and articles of manufacture have been disclosed that increase the strength of a stringer in, for example, an aircraft, while reducing manufacturing time and costs. The example apparatus described herein may be used with composite stringers and skins to prevent cracking of the stringers and/or the skins due to thermal expansion and contraction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a composite structure of an aircraft;
a stringer formed by a first stiffener segment and a second stiffener segment, each of the first and second stiffener segments having a first portion extending away from the composite structure and a second portion extending substantially perpendicular to the first portion and coupled to the composite structure, each second portion including an end, each end including a chamfer having a chamfer angle between 13 and 17 degrees, each end further including an edge to which the chamfer tapers, each edge having a thickness between 0.08 and 0.12 inches, the first and second stiffener segments and the composite structure defining a stringer radius gap; and
a gap filler disposed in the stringer radius gap, the gap filler including chopped carbon fiber flakes randomly distributed throughout substantially an entire volume of the gap filler, respective ones of the chopped carbon fiber flakes having a square shape defined by edges measuring between 0.005 and 3.0 inches in length.

2. The apparatus as defined in claim 1, wherein the gap filler further includes a thermoset resin in which the chopped carbon fiber flakes are disposed.

3. The apparatus as defined in claim 1, wherein the gap filler has a volume fraction of the chopped carbon fiber flakes between 45% and 65%.

4. The apparatus as defined in claim 1, wherein the gap filler further includes micron or nano-particles to increase a toughness of the gap filler.

5. The apparatus as defined in claim 1, wherein the gap filler has a fracture toughness of at least 2 inch-pounds per square inch.

6. The apparatus as defined in claim 1, wherein the gap filler has a minimum tensile strength of 15 kilopounds per square inch.

7. The apparatus as defined in claim 1, wherein the gap filler has an elastic modulus between 0.5 and 8 megapounds per square inch.

8. The apparatus of claim 1, wherein the respective ones of the chopped carbon fiber flakes are oriented in multiple directions in any given plane of the gap filler.

9. The apparatus of claim 1, wherein the edges of the respective ones of the chopped carbon fiber flakes measure between 0.125 and 1.0 inches in length.

10. The apparatus of claim 1, wherein the chopped carbon fiber flakes of the gap filler have a density between 0.04 and 0.06 pounds per cubic inch throughout the gap filler.

11. The apparatus of claim 10, wherein the first and second stiffener segments include carbon fibers having a density between 0.04 and 0.06 pounds per cubic inch throughout the first and second stiffener segments.

12. The apparatus of claim 1, wherein the chamfer angle is 15 degrees and the thickness is 0.1 inches.

13. A method comprising:

forming chopped carbon fiber flakes and a resin into a gap filler, the chopped carbon fiber flakes being randomly distributed throughout substantially an entire volume of the gap filler, respective ones of the chopped carbon fiber flakes having a square shape defined by edges measuring between 0.005 and 3.0 inches in length;

curing the gap filler formed by the chopped carbon fiber flakes; and inserting the gap filler into a radius gap of a stringer, the stringer formed by a first stiffener segment and a second stiffener segment, each of the first and second stiffener segments having a first portion configured to extend away from a composite structure and a second portion extending substantially perpendicular to the first portion and configured to be coupled to the composite structure, each second portion including an end, each end including a chamfer having a chamfer angle between 13 and 17 degrees, each end further including an edge to which the chamfer tapers, each edge having a thickness between 0.08 and 0.12 inches, the first and second stiffener segments defining the radius gap.

14. The method as defined in claim 13, wherein curing the gap filler includes applying heat and pressure to the gap filler.

15. The method as defined in claim 13, wherein forming the chopped carbon fiber flakes and resin into the gap filler includes extruding the chopped carbon fiber flakes through a die.

16. The method as defined in claim 13, wherein forming the chopped carbon fiber flakes and resin into the gap filler includes using a multiple variable diameter roller die forming process.

17. The method as defined in claim 13, wherein forming the chopped carbon fiber flakes and resin into the gap filler includes applying heat and pressure to the gap filler, wherein the gap filler is disposed in a mold.

18. The method as defined in claim 17, further including cooling the gap filler in the mold and removing the gap filler from the mold after the gap filler is cooled.

19. An apparatus comprising:

a composite structure of an aircraft;

a stringer formed by a first stiffener segment and a second stiffener segment, each of the first and second stiffener segments having a first portion extending away from the composite structure and a second portion extending substantially perpendicular to the first portion and coupled to the composite structure, each second portion including an end, each end including a chamfer having a chamfer angle between 13 and 17 degrees, each end further including an edge to which the chamfer tapers, each edge having a thickness between 0.08 and 0.12 inches, the first and second stiffener segments and the composite structure defining a stringer radius gap; and a gap filler disposed in the stringer radius gap, the gap filler including chopped carbon fiber flakes randomly distributed throughout substantially an entire volume of the gap filler.

20. The apparatus of claim 19, wherein the chamfer angle is 15 degrees and the thickness is 0.1 inches.

* * * * *